No. 834,724. PATENTED OCT. 30, 1906.
J. C. HARRIS.
HAY STACKER.
APPLICATION FILED JAN. 8, 1906.
3 SHEETS—SHEET 1.
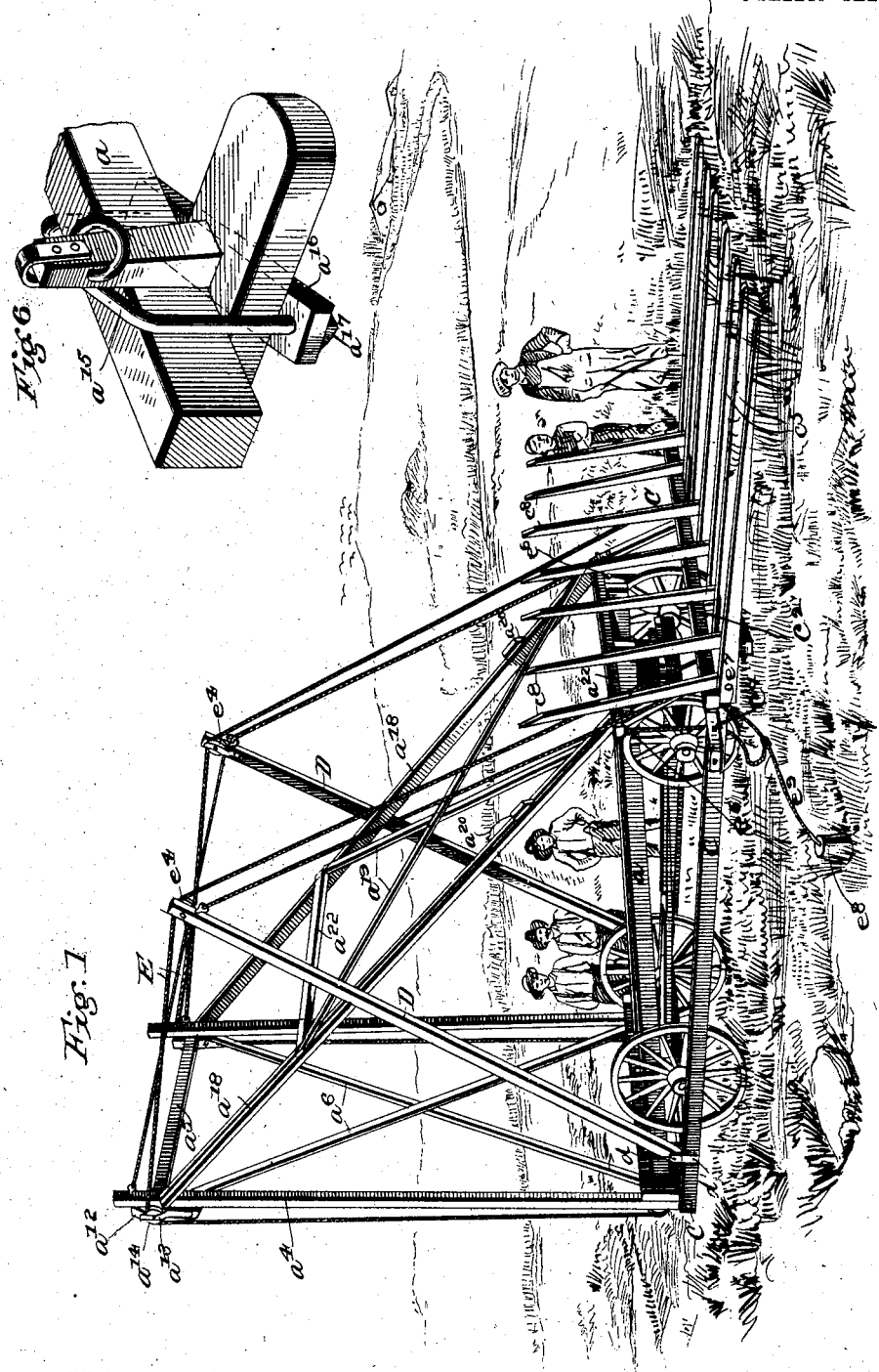
WITNESSES:
INVENTOR
JOHN C. HARRIS
BY
ATTORNEYS

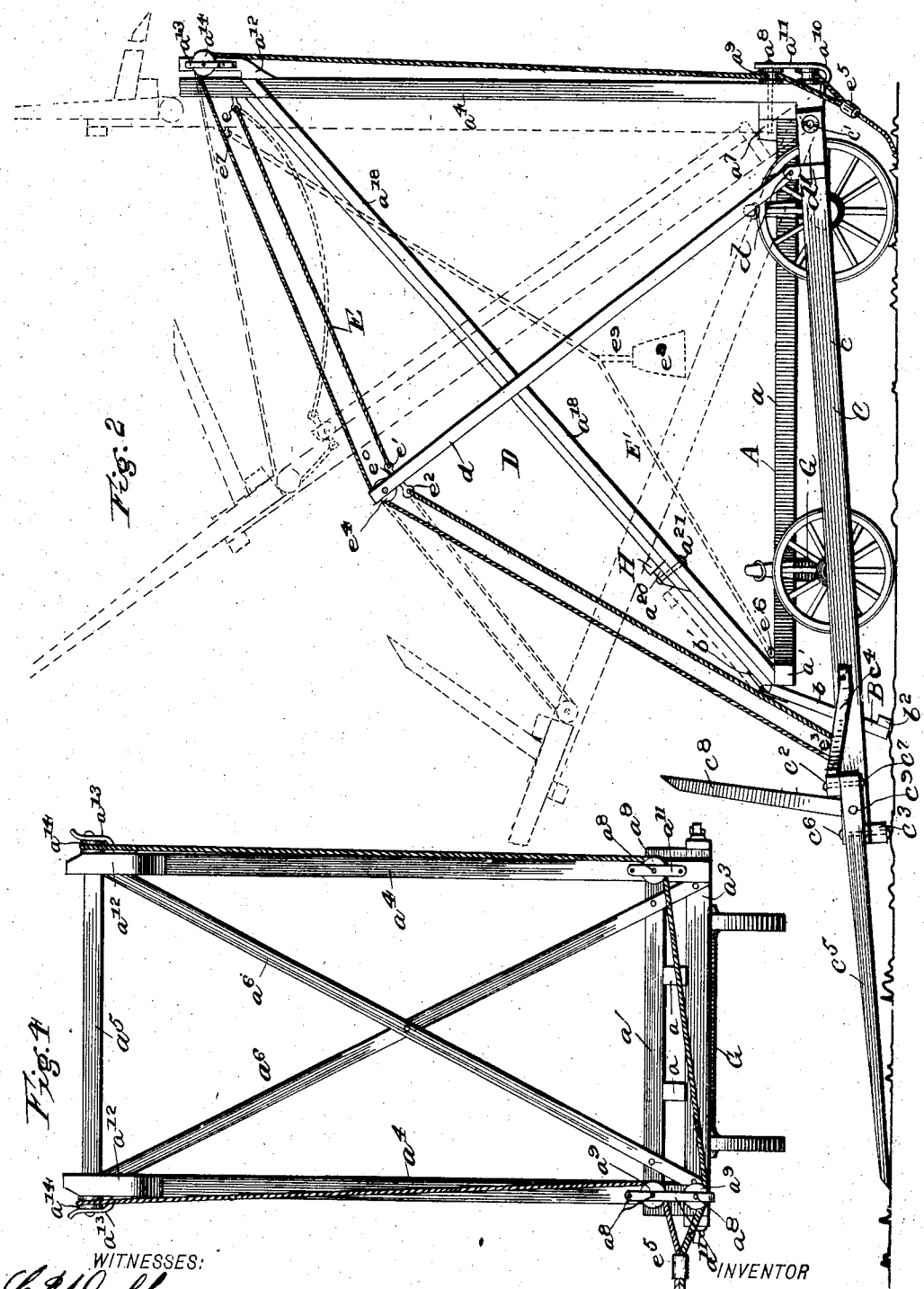

No. 834,724. PATENTED OCT. 30, 1906.
J. C. HARRIS.
HAY STACKER.
APPLICATION FILED JAN. 8, 1906.
3 SHEETS—SHEET 3.
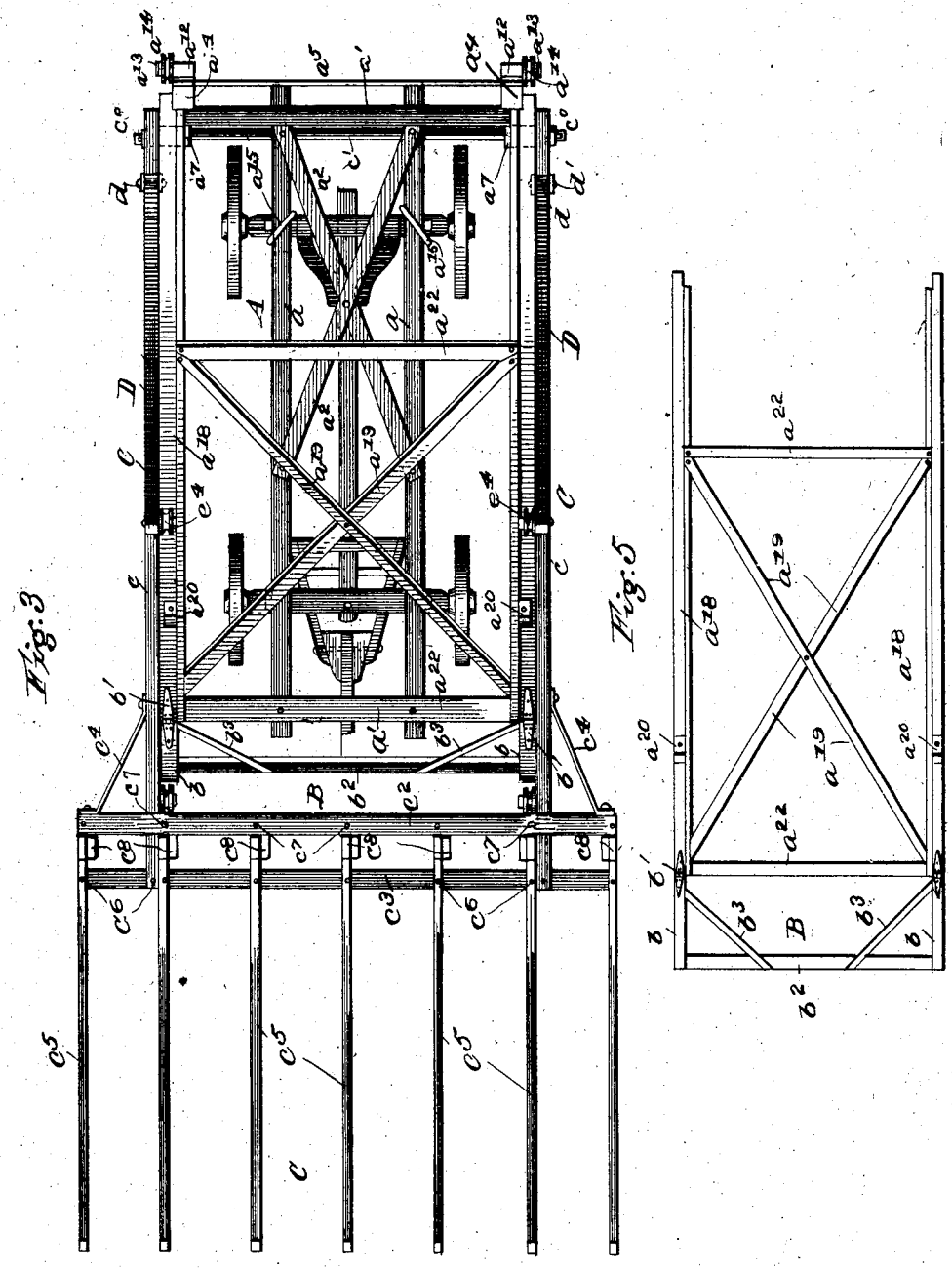
WITNESSES:
INVENTOR
John C. Harris
BY
ATTORNEYS

UNITED STATES PATENT OFFICE.

JOHN C. HARRIS, OF GREELEY, NEBRASKA.

HAY-STACKER.

No. 834,724.  Specification of Letters Patent.  Patented Oct. 30, 1906.

Application filed January 8, 1906. Serial No. 295,099.

*To all whom it may concern:*

Be it known that I, JOHN C. HARRIS, a citizen of the United States, and a resident of Greeley, in the county of Greeley and State of Nebraska, have made certain new and useful Improvements in Hay-Stackers, of which the following is a specification.

My invention is an improvement in hay-stackers; and it consists in certain novel constructions and combinations of parts, as will be hereinafter described and claimed.

In the drawings, Figure 1 is a perspective view of my improvement. Fig. 2 is a side elevation. Fig. 3 is a top plan view. Fig. 4 is a rear elevation. Fig. 5 is a plan view of the braces for the uprights and the gate attached thereto, and Fig. 6 is a detail of the connection of the stacker with the wagon-bolster.

In the practical application of my invention I provide a frame A, comprising the longitudinal bars $a$, adapted to be received between the standards of a wagon and connected at their ends by the cross-bars $a'$, extending beyond the sides of the wagon, as shown in Fig. 3. Braces $a^2$ are arranged upon the longitudinal bars, and a second cross-bar $a^3$ is arranged on the bottom of the longitudinal bars at the rear end thereof, as clearly shown in Fig. 4.

Uprights $a^4$ are bolted to the rear cross-bars and are connected at their upper ends by a cross-bar $a^5$, the upright frame thereby produced being suitably braced by the braces $a^6$. Blocks $a^7$ are arranged in front of the rear upper cross-bar $a'$, and bolts $a^8$ traverse the blocks, the cross-bar and the uprights, the extending end of the bolt being supported by a bracket $a^{11}$. A similar block $a^7$ is arranged in front of the lower cross-bar at one side of the machine, and a similar bolt $a^8$ traverses the block, lower cross-bar, and the upright, the free end of the bolt being supported by the bracket $a^{11}$ upon that side. Pulleys $a^9$ are arranged upon the ends of the bolts between the uprights and the brackets, there being two pulleys upon one side and one upon the other side, as clearly shown in Fig. 4.

Blocks $a^{12}$ are arranged upon the rear face of the uprights at the upper end thereof, and upon the outer faces of the blocks are arranged brackets $a^{13}$, pulleys $a^{14}$ being arranged between the brackets and the blocks and supported by bolts traversing the brackets and the blocks.

Brace-arms $a^{18}$ are connected with the front cross-bar $a'$ and with the uprights $a^4$, the brace-arms being connected by cross-bars $a^{22}$ and braced by braces $a^{19}$, as shown in Fig. 5, and to the lower ends of the brace-arms is hinged a gate B, comprising the longitudinal bars $b$, connected by the hinges $b'$ to the brace-arms, the longitudinal bars being connected at their outer ends by a cross-bar $b^2$ and suitably braced by braces $b^3$.

The frame is intended to be placed upon the running-gear of an ordinary wagon, the longitudinal bars $a$ being received between the standards and secured thereto by a yoke $a^{15}$. The body of the yoke rests upon the longitudinal bars $a$, and the arms thereof extend below the lower faces of the bolsters, where they are engaged by a plate $a^{16}$, the whole being secured in place by the nuts $a^{17}$. Upon the upper faces of the brace-arms $a^{18}$ are arranged blocks $a^{20}$, secured in place by bolts and nuts $a^{21}$, for a purpose to be hereinafter described.

A fork-frame C, comprising the side arms $c$, connected at their front ends by upper and lower cross-bars $c^2$ $c^3$, is pivoted upon the frame by means of a shaft $c'$, traversing the longitudinal bars $a$, and the side arms $c$, the parts being retained in position by washers and keys $o$ $c$ upon the ends of the shaft. The cross-bars $c^2$ $c^3$ are extended beyond the side arms $c$, the upper cross-bar being connected to the side arms by the braces $c^4$. Normally horizontal teeth $c^5$ are secured to the cross-bars at suitable intervals by means of bolts $c^6$ $c^7$, traversing the cross-bars and the teeth, and a normally vertical tooth $c^8$ is bolted to each of the horizontal teeth, as at $c^9$, between the upper and lower cross-bars.

Shear-arms D are pivoted, as at $d$, to a bracket $d'$, arranged upon the side arms $c$, for a purpose to be hereinafter described.

Hoisting-ropes E are connected with eyes $e$ on the uprights $a^4$ and pass from thence through the shear-arm D over a pulley $e^3$, journaled on the side arms $c$, and from thence upwardly over pulleys $e^4$, journaled in the free ends of the shear-arms, over the pulleys $a^{14}$ on the uprights, and downwardly to the pulleys $a^9$, the rope on the right of the machine, as shown in Fig. 4, extending to the left over the lower pulley $a^9$, the hoisting-ropes being connected beyond the pulleys $a^9$ by a clamp $e^5$.

Other ropes E' are connected to eyebolts $e^7$ upon the side arms $c$ and extend from thence to the eyebolts $e^6$ upon the lower cross-bar $a^{22}$ of the frame, and a weight $e^8$ is connected by a short rope $e^9$ to approximately the center of each of the ropes E'.

In Figs. 1 and 2 I have shown my improved stacker in position upon the wagon G, and I have provided a means for retaining the forked frame out of contact with the ground when it is being moved from place to place comprising the blocks $a^{20}$, before described, upon which may be placed a cross-bar H, the ends of the cross-bar extending a sufficient distance beyond the frame to receive the side arms of the fork-frame, whereby to retain the frame in its elevated position, as shown by dotted lines in Fig. 2.

The pitch of the normally horizontal teeth $c^5$ may be increased or decreased by inserting blocks between the cross-bars and the teeth.

Where the ropes E pass through the shear-arms an eyebar $e^0$ is interposed in the length of the rope.

In operation the fork-frame being in position such that the teeth $c^5$ are on the ground a shock of hay is drawn thereon. Power is then applied to the ends of the ropes E, which elevates the frame, and with it the load of hay. In the first part of the movement of the frame it travels only half as fast as the ends of the ropes to which power is applied. When the frame contacts with the shear-arms, the pull is direct, this giving a quick jerk of the frame, whereby to throw the load upon the stack.

When moving the stacker, the fork-frame is elevated, and the bar H is laid upon the blocks to support it in its elevated position.

The brace-arms $a^{18}$ act as guides for the fork-frame, compelling it to move in correct alinement with the frame and with the side arms parallel and in the same horizontal plane. The gate B serves as a guide for the fork-frame when below the base portion of the frame.

Having thus described my invention, what I claim as new, and desire to secure by Letters Patent, is—

1. In apparatus of the class described, the combination with a base adapted to rest upon the running-gear of a wagon, an upright frame secured to the rear of the base, braces connecting the front corners of the base with the upper corners of the upright frame, pulleys journaled at the upper corners of the upright frame, a fork-frame comprising side arms pivoted to the base at the rear end thereof, cross-bars connecting the front ends of the side arms, a series of longitudinally-projecting teeth secured to the cross-bars, a series of upwardly-projecting teeth secured to the longitudinal teeth, pulleys journaled on the side arms near the front end thereof, shear-arms pivoted adjacent to the rear ends of the side arms, pulleys journaled in the ends of the shear-arms, pulleys at the rear ends of the base, and a flexible connection leading from each upright through the corresponding shear-arm, around the pulley on the side arm, over the pulleys on the shear-arm, the upright and the base, one of said connections passing transversely of the base at the rear of the frame, and a clamp for connecting the connections beyond the pulleys on the base.

2. In apparatus of the class described, the combination with a base adapted to rest upon the running-gear of a wagon, an upright frame secured to the rear of the base, a fork-frame comprising side arms pivoted to the sides of the base at the rear thereof, and cross-bars provided with teeth connecting the front ends of the side arms, means for raising and lowering the fork-frame, braces connecting the upper ends of the uprights with the corners of the base at the front thereof whereby to guide the fork-frame, and a gate hinged to the lower ends of the braces, whereby to form an extension of said guiding means.

3. In apparatus of the class described, the combination with a base, an upright frame secured to the rear end of the base, braces connecting the upright frame with the base, a fork-frame comprising side arms pivoted to the sides of the base at the rear thereof, a plurality of cross-bars connecting the front ends of the side arms, the bars being arranged upon opposite sides of the side arms and spaced apart from each other, and a series of teeth arranged between the bars and connected thereto.

4. In apparatus of the class described, the combination with a base adapted to rest upon the running-gear of a wagon, of an upright frame secured to the rear thereof, braces connecting the upper corners of the uprights with the front end of the base, a fork-frame comprising side arms pivoted to the sides of the base at the rear thereof, cross-bars provided with teeth connecting the front ends of the side arms, blocks arranged upon the braces, and a bar resting on the blocks and engaging the side arms for maintaining the fork-frame in its elevated position.

JOHN C. HARRIS.

Witnesses:
W. J. LUSE,
T. J. HOWARD.